(12) United States Patent
Zhang

(10) Patent No.: US 7,210,053 B2
(45) Date of Patent: Apr. 24, 2007

(54) SYSTEMS AND METHODS FOR ASSIGNING TASKS TO DERIVED TIMERS OF VARIOUS RESOLUTIONS IN REAL-TIME SYSTEMS TO MAXIMIZE TIMER USAGE

(75) Inventor: Chao Zhang, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 10/931,322

(22) Filed: Aug. 31, 2004

(65) Prior Publication Data

US 2006/0064689 A1 Mar. 23, 2006

(51) Int. Cl.
G06F 1/00 (2006.01)
G06F 1/04 (2006.01)
G06F 1/14 (2006.01)

(52) U.S. Cl. .................. 713/500; 713/501; 713/502
(58) Field of Classification Search ................ 713/500, 713/501, 502
See application file for complete search history.

(56) References Cited

U.S. PATENT DOCUMENTS

| | | | |
|---|---|---|---|
| 6,182,238 B1 * | 1/2001 | Cooper | 714/2 |
| 6,408,324 B1 * | 6/2002 | Wallace et al. | 718/107 |
| 6,823,467 B1 * | 11/2004 | Cantrill | 713/600 |
| 7,020,877 B2 * | 3/2006 | Dailey | 718/102 |
| 2005/0235085 A1 * | 10/2005 | Ichinose et al. | 710/200 |

\* cited by examiner

*Primary Examiner*—Lynne H. Browne
*Assistant Examiner*—Michael J. Brown
(74) *Attorney, Agent, or Firm*—Barry N. Young

(57) ABSTRACT

One or more derived timers based on a source timer are provided to accommodate a plurality of periodic tasks while maintaining the high resolution of the source timer. To accommodate a number of periodic tasks, a number of derived timers can be selected utilizing a novel method based on the number of periodic tasks that are most time-critical, the number of tasks that are less time-critical, and the number of tasks that can be performed during the source timer interval. The interval and start time for each derived timer is selected based the source timer and number of the derived timer. After establishing the derived timers, the most time-critical tasks can be assigned to the source timer and the less time-critical tasks arranged amongst the derived timers.

37 Claims, 8 Drawing Sheets

SYSTEMS AND METHODS FOR ASSIGNING TASKS TO DERIVED TIMERS OF VARIOUS RESOLUTIONS IN REAL-TIME SYSTEMS TO MAXIMIZE TIMER USAGE

CROSS-REFERENCE TO RELATED APPLICATIONS

The following applications are cross-referenced and incorporated by reference herein in their entirety:

U.S. patent application Ser. No. 10/051,339, entitled ENFORCING QUALITY OF SERVICE IN A STORAGE NETWORK, filed Jan. 18, 2002;

U.S. patent application Ser. No. 10/051,053, entitled LOAD BALANCING IN A STORAGE NETWORK, filed Jan. 18, 2002;

U.S. patent application Ser. No. 10/051,321, entitled STORAGE SWITCH FOR STORAGE AREA NETWORK, filed Jan. 18, 2002;

U.S. patent application Ser. No. 10/051,396, entitled VIRTUALIZATION IN A STORAGE SYSTEM, filed Jan. 18, 2002;

U.S. patent application Ser. No. 10/836,133, entitled STORAGE SWITCH TRAFFIC BANDWIDTH CONTROL, filed Apr. 30, 2004.

BACKGROUND OF THE INVENTION

1. Field of the Invention

The present invention relates generally to timers and derived timers.

2. Description of the Related Art

In real-time systems, timers are frequently used in the performance of periodic jobs or tasks such as status polling, performance monitoring, and statistics collection, to name but a few examples. Timers can be used to calculate the amount of traffic at a node or port in a storage area network. Timers may be used to determine the status of a device connected to a port of a switch in such a network. The types and numbers of tasks and systems in which they are used are endless. Nevertheless, a common problem for many applications is that the maximum duration for each instance of such tasks is typically constrained to some fixed amount of time. Consider a task to poll the status of a pin for example. The amount of time between issuing a command to poll the pin status and receiving a result can be constrained to some maximum duration. If the result is not received within this maximum constrained amount of time, the system can fail the task and take appropriate action such as re-issuing the command, etc. So long as the interval or resolution of the timer is larger than the maximum duration for the task, the timer will not be overrun. If the timer interval is shorter than the maximum task duration, however, the timer will be overrun because the task cannot complete within the prescribed time period. One solution is to increase the timer interval.

Increasing a timer interval, however, may have negative effects on task-processing in many practical real-time systems. In many systems, there are a multitude of applications having many jobs or tasks that must be done periodically using a timer. Increasing the interval of the timer leads to coarser and coarser timer resolution. Many real-time tasks have hard time limits. If the timer resolution becomes too coarse to meet the hard time limit for such a job, the job will fail. For example, a job may collect statistical or performance information at short time intervals to provide real-time statistical and performance updates (e.g. traffic load at a port of a storage area network switch). If the system's timer interval is increased to avoid overrun for some other task, the real-time updates may no longer be possible.

Thus, a tradeoff exists between avoiding timer overrun and avoiding the failure of jobs having hard time limits. If the interval of a timer is X, and the maximum duration of each task is Y, the number of tasks that can be executed is constrained to less than (X/Y). If the maximum duration of each job Y increases, the interval of the timer X must be increased to ensure that all jobs complete within the timer interval. At some point, however, the timer resolution may become so coarse that jobs having a hard time limit will fail.

Such problems can be exacerbated in systems where a single processor handles tasks for multiple devices such as multiple ports of a storage switch with different port speeds. Various tasks associated with each port may require a timer interval of varying resolution. For example, calculating the data transferred at a slower port may not need as short an interval as calculating the data transferred at a faster port. Numerous other examples of timer resolution conflicts amongst tasks in such environments will be apparent.

Accordingly, there is a need for timing techniques for multiple tasks having different timer resolution requirements that avoid timer overrun and provide hard time limits for needed tasks.

SUMMARY OF THE INVENTION

In accordance with embodiments, systems and methods are provided to select and arrange derived timers to accommodate a plurality of periodic tasks.

One or more derived timers based on a source timer can be provided to accommodate a plurality of periodic tasks while maintaining the high resolution of the source timer. To accommodate a number of periodic tasks, a number of derived timers can be selected utilizing a novel method based on the number of periodic tasks that are most time-critical, the number of tasks that are less time-critical, and the number of tasks that can be performed during the source timer interval. The interval and start time for each derived timer is based on the source timer and number of the derived timer. After establishing the derived timers, the most time-critical tasks can be assigned to the source timer and the less time-critical tasks arranged amongst the derived timers.

In accordance with one embodiment, a method of providing timers for a plurality of periodic tasks is provided that comprises providing a source timer having a source timer interval, determining a first number of the plurality of periodic tasks that can be completed during the source timer interval, classifying a second number of the plurality of periodic tasks as most time-critical, classifying a third number of the plurality of periodic tasks as less time-critical, and providing a number of derived timers to be used for the plurality of tasks. The number of derived timers to provide is determined as greater than or equal to one less than a first result determined by dividing the third number of less time-critical tasks by a difference between the first number of the plurality of the periodic tasks that can be completed during the source timer interval and the second number of most time-critical tasks.

The method can further include, in one embodiment, determining an interval for each of the derived timers. The interval for each of the derived timers can be determined by multiplying the source timer interval by $2^n$, wherein n is a positive whole number used to individually represent each of the derived timers. N can have a maximum value equal to the number of derived timers and have a minimum value of one.

The source timer can have a start time and the method further comprise, in one embodiment, determining a start time for each of the derived timers. The start time for each of the derived timers can be determined by adding the source timer start time to a second result determined by multiplying the source timer interval by $2^{n-1}$.

In accordance with one embodiment, a system for time-based task processing is provided that comprises a plurality of periodic tasks including a first number of tasks that are most time-critical and a second number of tasks that are less time-critical, a source timer having a source timer interval, wherein a third number of said plurality of periodic tasks are capable of being completed during the source timer interval, and a number of derived timers based on the source timer. The number of derived timers is greater than or equal to one less than a first result obtained by dividing the second number of less time-critical tasks by a difference between the third number of said plurality of periodic tasks capable of being completed during the source timer interval and the first number of most time-critical tasks.

In one embodiment, each of the derived timers has an interval equal to a second result obtained by multiplying the source timer interval by $2^n$, wherein n is a positive whole number used to individually represent each of the derived timers and has a maximum value equal to the number of derived timers and a minimum value of one.

In one embodiment, the source timer has a start time and each of the derived timers has a start time equal to a third result obtained by adding the source timer start time to a fourth result determined by multiplying the source timer interval by $2^{n-1}$. The number of derived timers can include a first derived timer having a largest interval of the number of derived timers in one embodiment. The first derived timer can include a first instance having a start time determined by adding the source timer start time to the third result. The first derived timer can further include a second instance having a start time equal to the source timer start time.

In one embodiment, a first selected number of the second number of less time-critical tasks is assigned to each of the derived timers except the first derived timer. The first selected number is equal to the difference between the third number of the plurality of the periodic tasks that can be completed during the source timer interval and the first number of most time-critical tasks. A first half of a second selected number of the second number of less time-critical tasks can be assigned to the first instance of the first derived timer. The second selected number is equal to two times the difference between the third number of the plurality of the periodic tasks that can be completed during the source timer interval and the first number of most time-critical tasks. A second half of the second selected number of the second number of less time-critical tasks can be assigned to the second instance of the first derived timer.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

Other features, aspects, and objects of the invention can be obtained from a review of the specification, the figures, and the claims.

BRIEF DESCRIPTION OF THE DRAWINGS

FIG. 4b is a graph depicting timer overrun in a system such as FIG. 4a;

DETAILED DESCRIPTION

Figure 1:
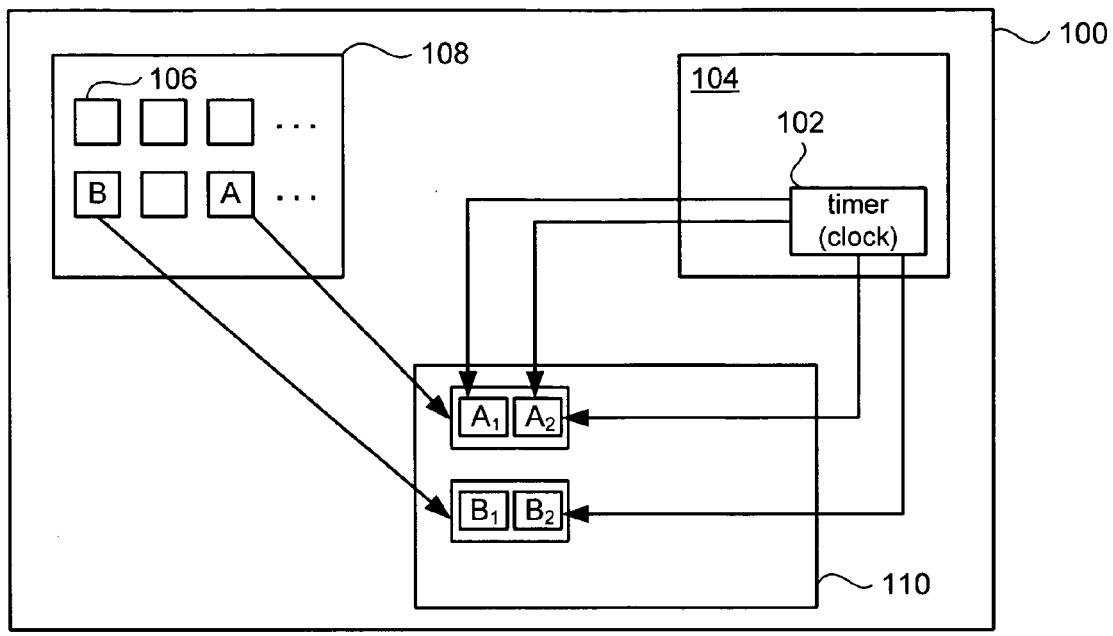
FIG. 1 is a generalized functional block diagram of a system in which timer overrun may occur in accordance with the prior art.

FIG. 1 depicts an exemplary system 100 including a source timer 102 and illustrates an example of timer overrun associated therewith. Timer 102 is associated with processor 104, although it will be appreciated that the present disclosure is not so limited and has application to timers in numerous hardware and software implementations. Source timer 102 could be a hardware timer based on an internal or external clock or a hardware or software-based timer derived from such a source timer. As will be appreciated, source timer 102 is set to a source timer interval (e.g., X units of time). This interval may be indicated by a pulse generated from the timer, a change in polarity of a signal emanated from timer 102, or a software event triggered by the timer, etc.

System 100 is charged with processing a number of applications 106 including application A and application B. Applications 106 are maintained at location 108, which can be a location remote or local to processor 104. For example, location 108 can represent a local storage device in a processing system in communication with processor 104 or some remote storage or location accessible to processor 104 over one or more networks. Applications 106 can be remotely processed or forwarded to a location 110 local to processor 104. Location 110 could include a local faster memory such as SRAM or an internal memory of processor 104. Applications A and B can be loaded to location 110 for processing by processor 104.

Application A includes tasks $A_1$ and $A_2$, which require periodic processing. That is to say, tasks $A_1$ and $A_2$ require periodic processing periodically over some interval of time. As such, processor 104 will require timer 102 in order to process tasks $A_1$ and $A_2$. For example, task $A_1$ may be charged with polling the status of a pin and devices connected thereto for system 100. Task $A_2$ on the other hand, may be charged with performing statistical or performance analysis having time based calculations. Accordingly, task $A_1$ may use timer 102 to set a prescribed maximum duration for receiving a status indication after polling the pin's status. If the status of the pin is not retrieved within this maximum duration as determined by the interval timer 102, the task can fail and be repeated, etc. Similarly, task $A_2$ may use timer 102 to perform a statistical or performance calculation based on network traffic at a port during a time period set by the timer interval.

Application B is also loaded into location 110 to be processed by processor 104. Associated with application B are tasks $B_1$ and $B_2$, both requiring timer 102. Accordingly, in the embodiment depicted in FIG. 1, processor 104 is processing two applications each of which includes two distinct tasks requiring use of timer 102. If we assume that timer 102 has a timer interval of 3 milliseconds and a maximum of three tasks can be completed in 3 milliseconds by processor 104, timer 102 will be overrun because only three tasks can be completed during each interval of the timer. One task will not be able to be completed during every interval of the timer.

Figure 2:
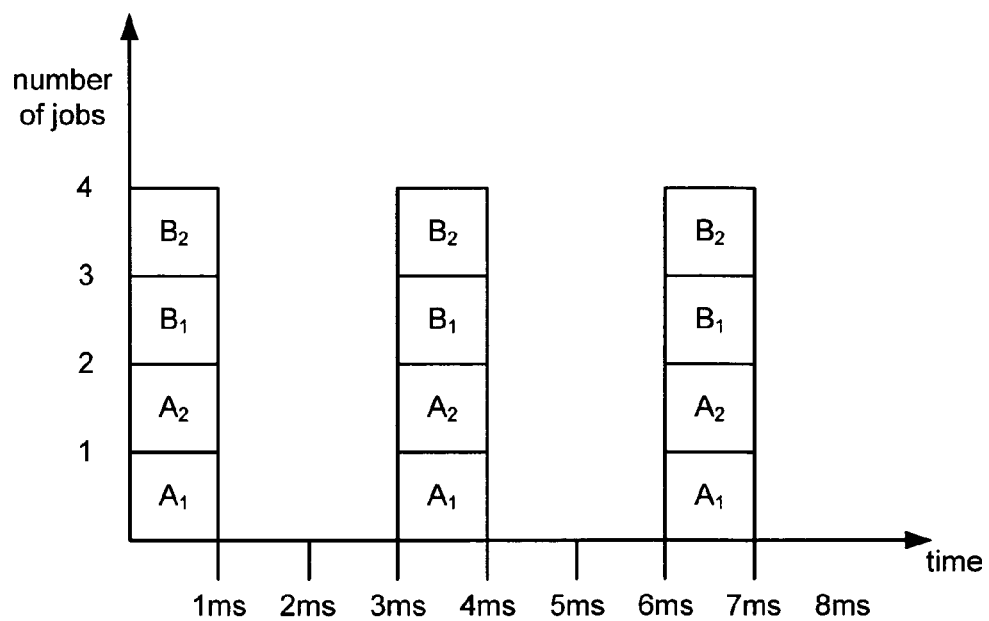
FIG. 2 is a graph depicting the timer overrun of FIG. 1.

FIG. 2 depicts the overrun of timer 102 in a graph of the number of jobs that can be completed, plotted against time. At 0 ms, timer 102 begins processing tasks $A_1$, $A_2$, $B_1$ and $B_2$ using timer 102 is initiated. If only three tasks can be completed during the 3 ms timer interval, one task will not be completed and will cause overrun at timer 102. As depicted at 0 ms, only three jobs can be processed within the 3 ms interval of time. Therefore one of the jobs (e.g., $B_2$) will not be processed and will cause timer overrun. The timer will be overrun during each interval of the timer. At 3 ms, for example, the timer will begin a second 3 ms interval, at which time three tasks will be processed and one task will not complete. Although task $B_2$ is illustrated as not being completed during each interval, the actual task failing to complete may vary during different intervals.

In order to accommodate processing for each task during the interval of timer 102, the interval of the timer can be increased to increase the overall time for processing tasks. For a task such as polling the status of a pin (task $A_1$), an increase in the timer interval may be acceptable. For a task such as statistics collection or performance analysis (e.g., task $A_2$), however, decreasing the timer resolution can cause the task to fail or be unable to be completed. If the statistics or analysis is to be updated at a prescribed interval that is shorter than the increased timer interval, the task will not be able to be completed as specified. As illustrated in FIGS. 1 and 2, a direct tradeoff between avoiding overrun and avoiding the failure of tasks with hard time limits exists.

In accordance with various embodiments, derived timers of various resolutions can be selected and arranged to maximize the usage of a source timer in order to ensure that time critical jobs having hard time limits can utilize a timer having a sufficiently fine resolution while also ensuring that all jobs are completed without overrunning the source timer. Consider a source timer that is triggered by a clock source at every X units of time, thus having an interval or resolution of X units of time. Based on the source timer interval X, the number of time-critical tasks, and the total number of periodic tasks, derived timers can be selected with resolutions calculated according to:

$$X \cdot 2^n \quad \text{(equation 1)}$$

where n is a positive whole number representing the number of the derived timer.

Different jobs or tasks can be assigned to the various derived timers of various resolutions. Jobs or tasks that are more time critical than others can be assigned to the source timer or to one or more derived timers having higher resolutions. Jobs not having a hard-time limit and not being as time-critical can be assigned to other derived timers with lower resolutions. For example, if the source timer has a resolution of X seconds, a set of derived timers can be arranged with resolutions of 2X seconds, 4X seconds and 8× seconds. The most time critical jobs can be assigned to the highest resolution×second timer, the less time-critical jobs assigned to the 2X second and 4X second timers, and the least time-critical jobs assigned to the 8X second timer. In this manner, the most time-critical jobs are still triggered by a timer having a high resolution. Accordingly, these jobs will not fail due to the coarse resolution of a timer that is unable to meet the hard time limit of the job. The less time-critical periodic jobs can be processed with the derived timers to avoid overrunning the source timer.

To ensure that time critical jobs can take advantage of the high resolution source timer, the start time of each derived timer having a resolution calculated according to equation 1, is calculated according to:

$$T_0 + X \cdot 2^{(n-1)} \quad \text{(equation 2)}$$

where $T_0$ is the start time of the source timer and X is the source timer resolution. This start time is calculated in terms of when the derived timer is first triggered. For example, if the source timer starts at time $T_0$, and has resolution of X ms the first derived timer (n=1) will start at $T_0 + X \cdot 2^{(1-1)} = T_0 + 1X$ ms. If the resolution of the source timer is X and the derived timer resolutions are 2X, 4X and 8X, then timer 2X starts at time $T_0 + X \cdot 2^{(1-1)} = T_0 + 1X$; timer 4X starts at time $T_0 + X \cdot 2^{(2-1)} = T_0 + 2X$; and timer 8X starts at timer $T_0 + X \cdot 2^{(3-1)} = T_0 + 4X$.

Figure 3:
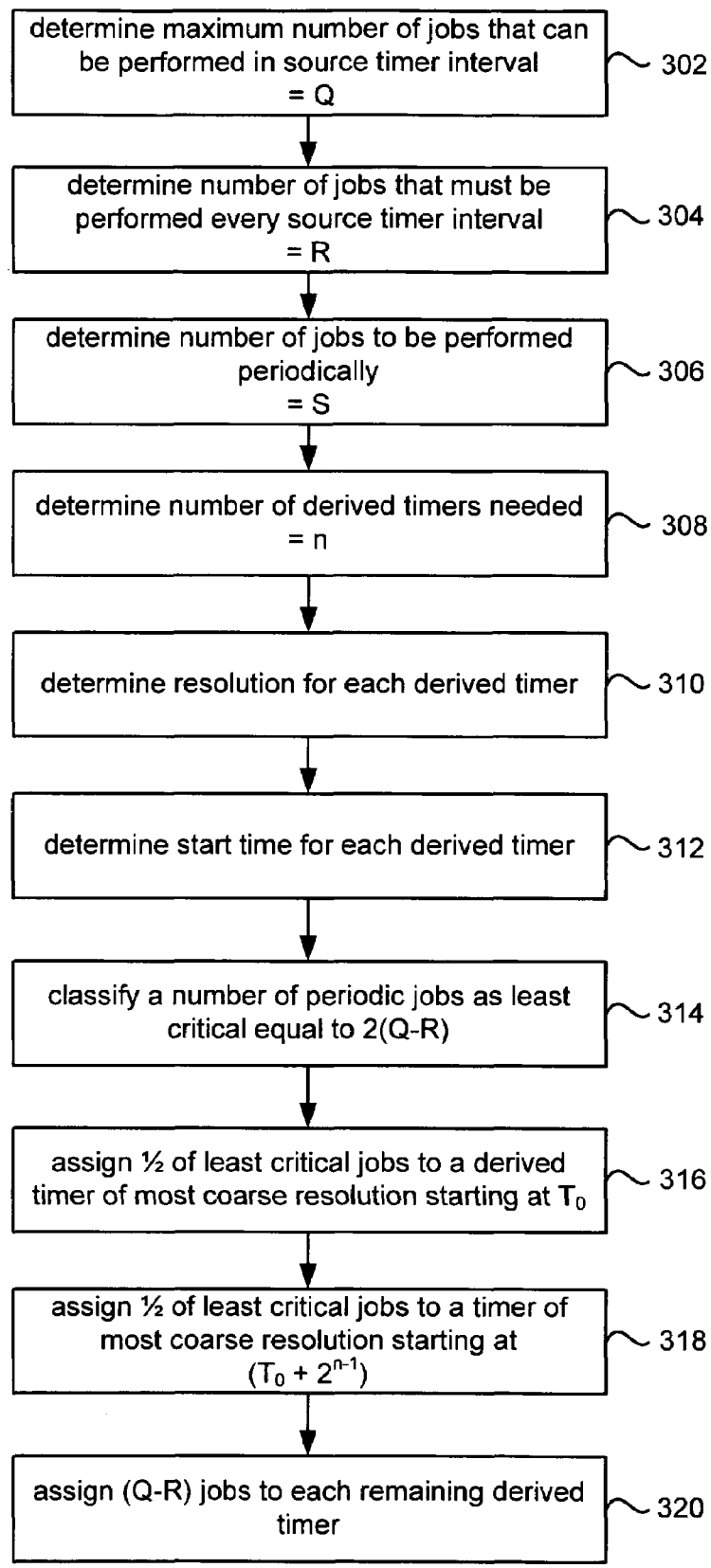
FIG. 3 is a flowchart of a method in accordance with one embodiment for selecting and arranging derived timers from a source timer.

In order to determine the number of derived timers needed to execute a number of time critical and less time critical tasks, the resolution and start time of each derived timer, and the proper assignment of tasks to each timer, a novel method for selecting and arranging derived timers is provided. FIG. 3 is a flowchart in accordance with one embodiment for arranging a number of derived timers based on a source timer to maintain the high resolution source timer while also providing a number of derived timers to accommodate a number of less time-critical tasks.

The maximum number of jobs (Q) that can be performed during the source timer interval is determined at step 302. Step 302 can include any number of techniques in embodiments for determining the maximum number of jobs that can be performed during a source timer interval. For example, an increasing number of jobs can be attempted during the interval. Once jobs begin to fail, the number of assigned jobs can be determined to be the maximum number of jobs that can be performed during the source timer interval. In other embodiments, the times to complete individual tasks may be known and can be added to determine the maximum number of jobs that can be performed during the source timer interval.

At step 304, the number (R) of jobs that must be performed during every source timer interval is determined. The number of jobs that must be performed during every source timer interval will vary by implementation and embodiment and can be determined according to the requirements of a particular implementation. In one embodiment, step 304 includes classifying a number of tasks as most time-critical rather than determining the number that must be performed during every source timer interval.

At step 306, the number (S) of periodic jobs that are to be performed during some period of time but that are not required to be performed during every source timer interval X is determined. These periodic jobs are required to be performed during some interval but do not have a hard time-limit necessitating a timer resolution as fine as that of the source timer resolution X. Thus, these jobs are less time-critical than those that must be performed during every source timer interval. In one embodiment, step 306 includes classifying a subset of a total number of periodic jobs as less time-critical.

At step 308 the number of derived timers needed to accommodate each time-critical and non-time critical periodic job or task is determined according to:

$$(n-1)\cdot(Q-R)+2\cdot(Q-R) \geq S \leq n \geq S/(Q-R)-1 \qquad \text{(equation 3)}$$

The number (n) of needed derived timers is greater than or equal to one less than the number of jobs that must be performed periodically divided by the difference between the maximum number of jobs that can be performed within the source timer interval X and the number of jobs that are required to be done during every source timer interval. As described hereinafter, during each source timer interval, the number (R) of jobs that must be performed during every source timer interval will be assigned to the source timer. A number of jobs equal to (Q-R) will be assigned to each derived timer. During different intervals, the number of jobs equal to (Q-R) can be assigned to different derived timers. For n derived timers, the lowest resolution timer will be assigned a number of jobs equal to $2\cdot(Q-R)$ and each of the remaining (n-1) timers will be assigned a number of jobs equal to (Q-R). The total number of jobs assigned to all derived timers must be less than or equal to S. Accordingly, as long as equation 3 holds true, there will not be timer overrun.

After determining the necessary number of derived timers, the resolution of each derived timer is determined at step 310 according to equation one. Each derived timer will have an interval equal to the source timer interval (X) times $2^n$ where n is equal to the number of the derived timer. The start time for each derived timer is calculated according to equation two at step 312. Each derived timer will start at some number of intervals of the source timer after the start time of the source timer.

With the number of jobs that must be performed during every source timer interval and the maximum number of jobs that can be performed during this interval determined, a number (S) of the less time critical periodic jobs are classified as least time-critical at step 314. This number of periodic jobs is determined according to:

$$2\cdot(Q-R) \qquad \text{(equation 4)}$$

A number of periodic jobs are classified as least critical that is equal to twice the difference between the maximum number of jobs that can be completed and the number of jobs that must be performed during the source timer interval.

At step 316, half of the least critical jobs classified at step 314 are assigned to a derived timer of the most coarse resolution starting at the same time as the source timer. If $T_0$ is the starting time of the source timer, a timer of the most coarse resolution will also start at $T_0$ and have half of the least critical jobs assigned to it. At step 318, the remaining half of the jobs classified as least time critical are assigned to a timer of the most coarse resolution starting at a time equal to $T_0+2^{n-1}$ (X time units). At step 320, a number of jobs calculated according to:

$$Q-R \qquad \text{(equation 5)}$$

are assigned to each remaining derived timer.

According to the flow chart of FIG. 3, the number of jobs that must be performed during every source timer interval will be assigned to the source timer and will be performed during every source timer interval. Additionally, a derived timer can begin at each start of the source timer and have a number of jobs equal to (Q-R) assigned to it.

Figure 4A:
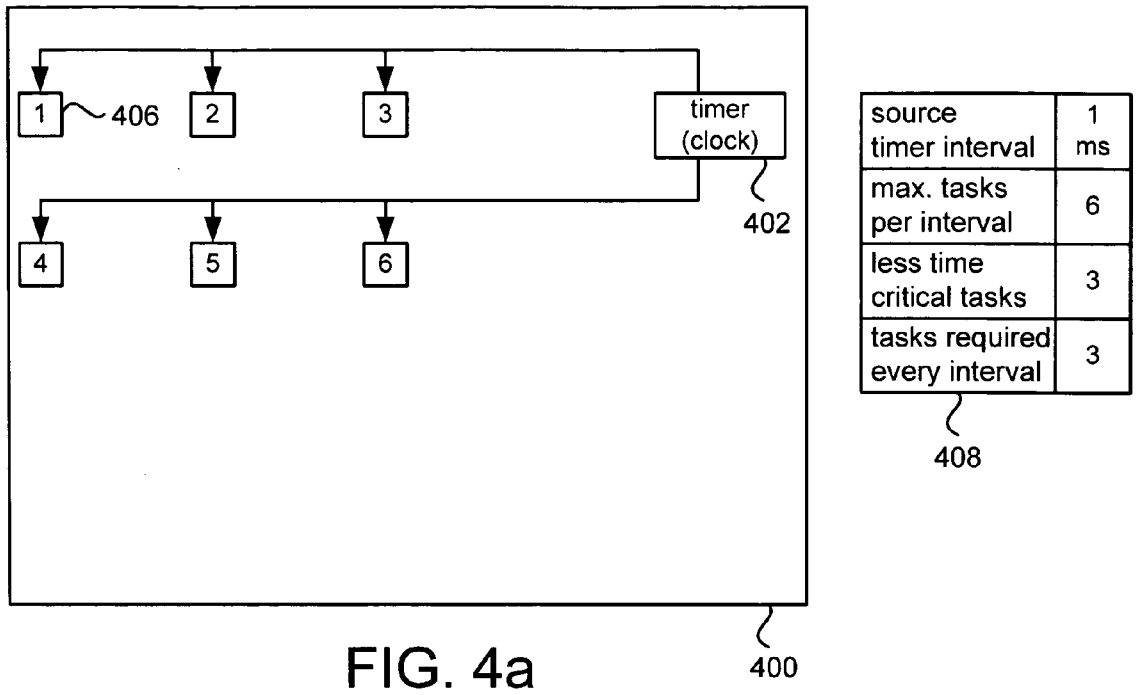
FIG. 4a is a generalized functional block diagram of system including a source timer.

The principles and techniques just described are further detailed according to an example presented with respect to FIGS. 4a–7 in accordance with one embodiment. FIG. 4a depicts a system 400 including a source timer 402. System 400 can be any number of system types that include a source timer and process a number of tasks requiring use of a timer. Timer 402 can be a software or hardware-based timer. Furthermore, although timer 402 is described as a source timer, it will be appreciated that a source timer can include a timer derived from one or more other source timers. For example, timer 402 can be a software-based source timer derived from a hardware timer or a hardware-based timer derived from another hardware timer. System 400 includes a number of jobs or tasks 406 denoted as jobs or tasks 1 through 6. As denoted in box 408, a number of assumptions are made with respect to the example of FIG. 4. The source timer's resolution is assumed to be 1 millisecond. The number of time critical jobs that are required to be performed during every source timer interval of 1 ms is three and the number of non-time critical periodic jobs that must be performed during some time period but that are not required to be performed during the source timer interval is also three. Finally, the maximum number of jobs that can be performed during every source timer interval of 1 ms is six.

In FIG. 4a, system 400 is capable of handling and processing each of the necessary tasks while avoiding timer overrun and maintaining a sufficiently fine timer resolution for any tasks having a hard-time limit. Since timer 402 can accommodate six tasks during each source timer interval, tasks 1 through 6 are all capable of being executed in a timely fashion within the source timer interval.

Figure 4B:
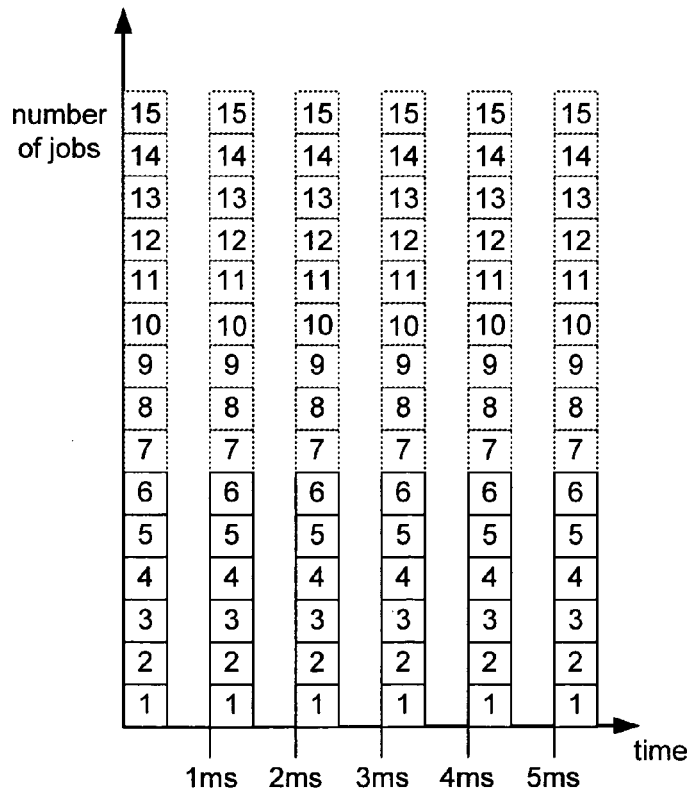

If the total number of tasks is increased beyond six, however, timer 402 may experience overrun. Source timer 402 is at its maximum potential when processing six tasks during each interval. For example, if the number of tasks is increased from 6 to 15, 9 task will fail to complete during each source timer interval causing overrun of timer 402. This overrun is depicted in FIG. 4b. As illustrated, each of tasks 7–15 will fail to complete during each source timer interval.

Figure 5:
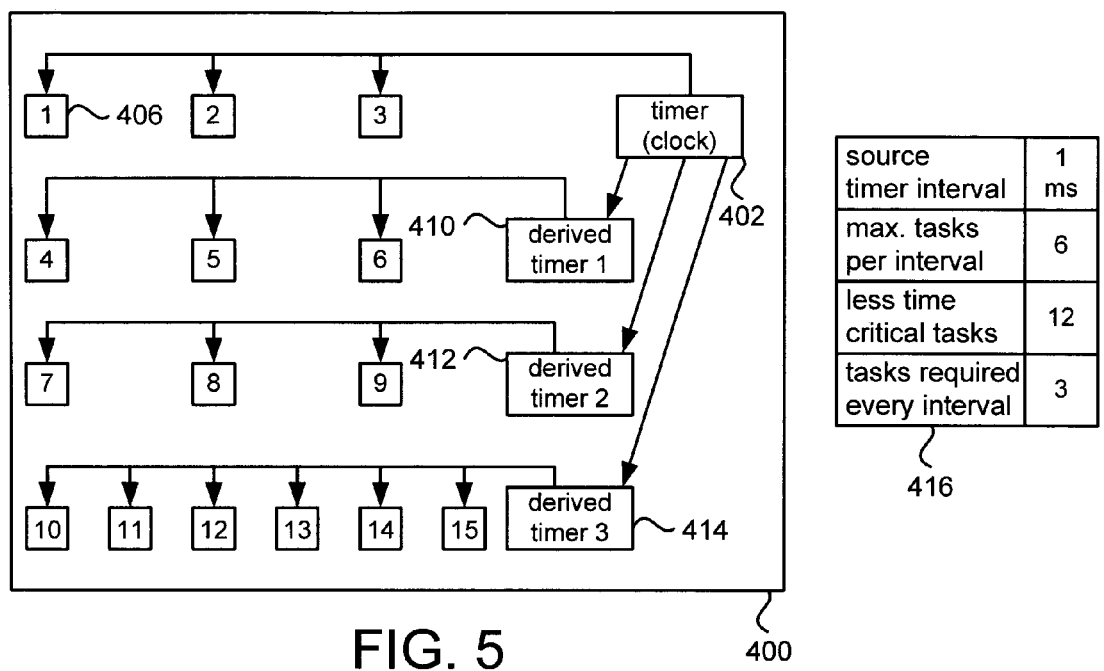
FIG. 5 is a generalized functional block diagram of a system including derived timers in accordance with one embodiment.

FIG. 5 depicts system 400 in another scenario where a number of derived timers in accordance with embodiments are used to accommodate the increased number of task. As denoted in box 416, a number of assumptions are again made. The source timer interval is still 1 ms, the number of jobs required to be performed during each source timer interval is still three, and the number of jobs that can be performed within one source timer interval is still six. However, the number of periodic non-time critical jobs has been increased from 3 to 12.

Because only six jobs can be performed within each source timer interval of 1 ms, nine jobs will not complete during each source timer interval if only the source timer is used. Accordingly, a number of derived timers are selected and arranged in accordance with embodiments. The fine resolution of the source timer can be used for the time-critical tasks while the derived timers can be used to accommodate each of the remaining non-time critical periodic tasks. By employing the method depicted in FIG. 3 and the novel derived timer determinations presented herein, an appropriate number of derived timers can be arranged to accommodate each task to be processed by system 400.

The number of derived timers can be determined according to equation three. Since there are 12 non-critical jobs (S) that must be performed during some time period, a maximum of six jobs (Q) that can be performed during each time period, and three jobs (R) that must be performed during each time period, the number of derived timers is determined to be three (12/(6−3)−1). Thus, each task can be processed without timer overrun if three derived timers are used in addition to the source timer.

Figures 6, 7:
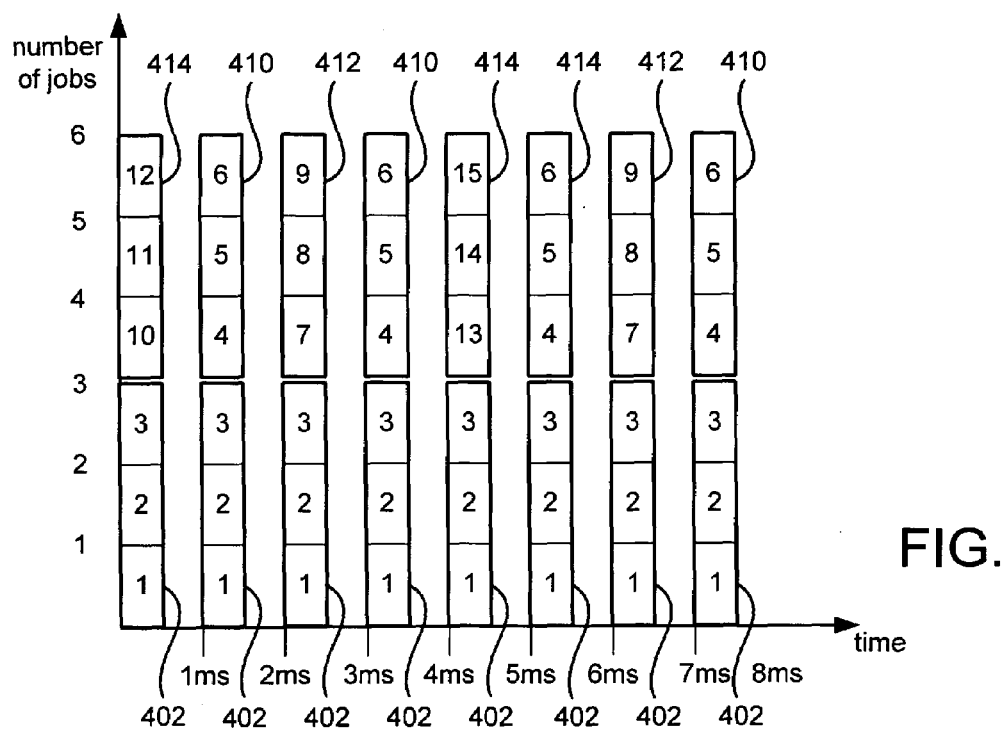
FIG. 6 is a table depicting the parameters of the timers of FIG. 5.
FIG. 7 is a graph depicting the assignment of the tasks of FIG. 5 to the derived timers of FIG. 5.

After determining the necessary number of derived timers, the resolution of each derived timer can be determined. FIG. 6 is a table depicting the parameters for the source timer and each derived timer of the present example. The resolution of each derived timer shown in column 424 is determined according to equation one. For the first timer (n=1), the timer resolution is equal to the source timer resolution of 1 ms multiplied by $2^1$. Thus, the resolution of the first derived timer is 2 ms. The start time, shown in column 426, for the first derived timer is determined according to equation two. Assuming the start time of the source timer to be zero ($T_0=0$), the start time of the first derived timer is 1 ms ($0+2^{1-1}$). The second derived timer (n=2) has a resolution of 4 ms ($2^2$). The start time for the second derived timer is 2 ms ($0+2^{2-1}$). The final derived timer (n=3) has a resolution 8 ms ($2^3$). The start time of the third derived timer is 4 ms ($0+2^{3-1}$).

After having determined the resolution and start time for each derived timer, each task can be assigned to one of the source timers or derived timers. Referring again to FIG. 5, a number of periodic jobs not required to be performed during every source timer interval are classified as least time-critical. This number of periodic jobs is calculated according to equation four. Thus, in our example, six periodic jobs (2(6−3)) are classified as least time-critical. Half of the least time-critical jobs are assigned to the timer of the most coarse resolution (largest time interval) starting at the same time as the source timer. The other half are assigned to the same most coarse resolution timer, but starting at a time equal to the source timer start time plus 4 ms ($T_0+2^{3-1}$).

In FIG. 5, jobs 10 through 15 are classified as the least time-critical and are assigned to the third derived timer having the coarsest resolution of 8 ms. Three of the jobs (e.g., 10, 11, and 12) are assigned to the third derived timer starting at the same time (0 ms) as source timer 402. The three remaining least time-critical jobs (e.g., 13, 14, and 15) are assigned to the same timer, but start at 4 ms.

A number of jobs calculated according to equation 5 (Q−R) are assigned to each remaining derived timer. Thus, in our example, the number of jobs assigned to each remaining derived timer is three (6−3). In FIG. 5, tasks 4, 5 and 6 are assigned to derived timer 1 and tasks 7, 8 and 9 are assigned to derived timer 2.

In accordance with one embodiment therefore, tasks 1 through 15 have been assigned to a source timer or various derived timers in a manner that arranges the timers so that time-critical tasks having hard time limits are performed according to a high resolution source timer. Additionally, the remaining less time-critical tasks have been assigned to derived timers so that they are performed periodically without necessitating an increase in the source timer interval. Accordingly, lowering the source timer resolution to a point that tasks with hard time limits fail has been avoided while still accommodating the number of periodic tasks.

FIG. 7 is a graph illustrating each timer and the assignment of tasks during a period of time according to the present example. Tasks 1, 2 and 3 are assigned to source timer 402 which starts at time 0 ms. Tasks 10, 11 and 12 are assigned to the third derived timer 414 which also starts at time 0. Thus, six total tasks equal to the maximum number of tasks that can be performed during each source timer interval are assigned to some timer starting at time 0 ms. At 1 ms (after one source timer interval), source timer 402 is again initiated with tasks 1, 2 and 3 again being executed. Additionally, tasks 4, 5 and 6 are assigned to the first derived timer 410 which also starts at 1 ms Tasks 7, 8 and 9 are assigned to the second derived timer 412 which starts at 2 ms. The first derived timer 410 is again initiated at 3 ms to process tasks 4, 5, and 6 after expiration of its first 2 ms interval. At 4 ms, a second instance of the third derived timer 414 is initiated. This instance, however, has tasks 13, 14 and 15 assigned to it rather than tasks 10, 11 and 12. Accordingly, timers have been initiated to secure processing of all fifteen tasks without overrunning the source timer and while maintaining the source timer at its high resolution of 1 ms.

As an alternate to employing the method of FIG. 3 and the equations presented herein to arrange derived timers for all fifteen tasks, the source timer resolution can be adjusted to 3 ms to accommodate all the tasks according to the prior art. Since 6 tasks can be processed in 1 ms (source time interval), a total of eighteen tasks (3 ms×6 tasks/1 ms) can be processed in 3 ms. Although such an increase in the source timer interval would enable each task to be processed without timer overrun, the increase would have the deleterious effect of only triggering the 3 time-critical tasks every 3 ms rather than every 1 ms. This may break a hard-time limit for one or more of these tasks such that the job(s) fail by not meeting their hard time-limits. For example, real-time updates requiring a 1 ms re-calculation of values may not be possible.

The foregoing method can be applied and utilized in numerous implementations and situations. For example consider a processor-based system performing a process of statistics collection. The time to collect each individual statistic may be constrained to a fixed amount of time. If the number of instances of statistics collection grows over time, the system may experience timer overrun. For example, a timer sufficient to accommodate the initial number of instances of statistics collection may not be able to accommodate a dramatic increase in the number of instances. In typical systems, the source timer's interval may be increased to accommodate each instance of statistics collection.

However, as previously described, such may have deleterious effects in systems where the instance of statistics collection has a hard time-limit that must be met. If the time limit is not met by virtue of increasing the timer interval, the statistics collection task will fail. By using the present embodiments, however, certain statistics collection instances can be classified as most time-critical and some classified as less time-critical in order to accommodate all instances. In this manner, each instance can be processed while not increasing the source timer interval.

For example, statistics that are currently being shown to a user may be considered the most time-critical due to the frequency at which they are updated and presented to the user. A user viewing statistics on the fly or live at a display can have those statistics that he or she is currently viewing calculated according to a source timer of a high resolution. Other statistic collections that are to be made, but that are not currently being shown to the user, can be classified as less time-critical. The number of necessary derived timers to accommodate the less time-critical tasks can be determined. A number of the less time-critical tasks can be determined to be least time-critical and assigned to derived timers of the coarsest resolution. The most time-critical tasks can be assigned to the source timer. Accordingly, each task can be properly executed within a necessary time period, without timer overrun, and without increasing the source timer resolution to some undesired coarse resolution.

In accordance with one embodiment, derived timers in accordance with embodiments can be used in network traffic policing and shaping. Such derived timers can have great benefit in the context of storage area networks, and particularly, within storage switches for these networks which are charged with numerous tasks for virtualization and data transfer between initiating devices and underlying physical storage subsystems.

Figure 8:
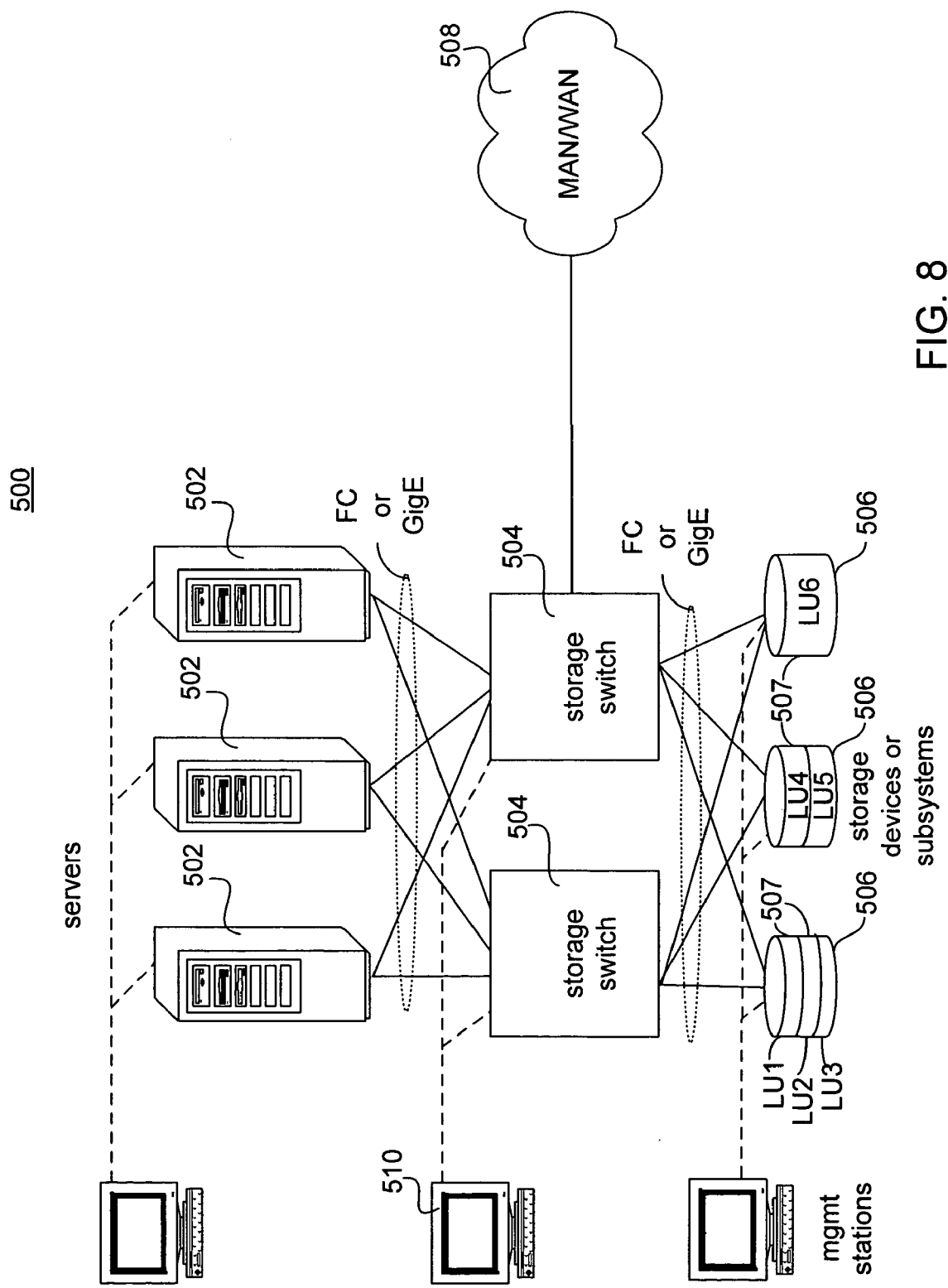
FIG. 8 is a generalized functional block diagram of a storage area network in accordance with one embodiment.

An exemplary system 500 including a storage switch that can be used in accordance with various embodiments is illustrated in FIG. 8. System 500 can include a plurality of initiating devices such as servers 502. It will be appreciated that more or fewer servers can be used and that embodiments can include any suitable physical initiator in addition to or in place of servers 502. Although not shown, the servers could also be coupled to a LAN. As shown, each server 502 is connected to a storage switch 504. In other embodiments, however, each server 502 may be connected to fewer than all of the storage switches 504 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined the Infiniband Trade Association, or other protocols or connections.

In some embodiments, one or more switches 504 are each coupled to a Metropolitan Area Network (MAN) or Wide Area Network (WAN) 508; such as the Internet. The connection formed between a storage switch 504 and a WAN 508 will generally use the Internet Protocol (IP) in most embodiments. Although shown as directly connected to MAN/WAN 508, other embodiments may utilize a router (not shown) as an intermediary between switch 504 and MAN/WAN 508.

In addition, respective management stations 510 are connected to each storage switch 504, to each server 502, and to each storage device 506. Although management stations are illustrated as distinct computers, it is to be understood that the software to manage each type of device could collectively be on a single computer.

Such a storage switch 504, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 504 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks and switches, including a network and switch as illustrated in FIG. 8 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" (or "virtual logical unit") come from the fact that storage space allocated per subscription can be anywhere on one or more physical storage target devices connecting to a storage switch 804. The physical space can be provisioned as a "virtual target" or "virtual logical unit (VLU)" which may include one or more "logical units" (LUs)507. Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target or VLU may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 9:
FIG. 9 is a generalized functional block diagram of a storage switch in accordance with one embodiment.

FIG. 9 illustrates a functional block diagram of a storage switch 504 in accordance with an embodiment of the invention. In one embodiment, the storage switch 504 includes a plurality of linecards 602, 604 and 606, a plurality of fabric cards 608, and two system control cards 610, each of which will be described in further detail below. Although an exemplary storage switch is illustrated, it will be appreciated that numerous other implementations and configurations can be used in accordance with various embodiments.

System Control Cards. Each of the two System Control Cards (SCCs) 610 connects to every line card 602, 604 and 606. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the Ethernet connections, the SCC also initiates various storage services, e.g., snapshot and replicate.

In addition, the SCC maintains a database 612 that tracks configuration information for the storage switch as well as all virtual targets and physical devices attached to the switch, e.g., servers and storage devices. Database 612 can be maintained in flash or some other non-volatile memory 611 at the SCC. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 504 can be reached by a management station 510 through the SCC 610 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 612.

Fabric Cards. In one embodiment of switch 504, there are three fabric cards 608, although other embodiments could have more or fewer fabric cards. Each fabric card 608 is coupled to each of the linecards 602, 604, 606 in one embodiment and serves to connect all of the linecards together. In one embodiment, the fabric cards 608 can each handle maximum traffic when all linecards are populated. Such traffic loads handled by each linecard are up to 160 Gbps in one embodiment although other embodiments could handle higher or lower maximum traffic volumes. If one fabric card 608 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 504 supports up to sixteen linecards although other embodiments could support a different number. Further, in one embodiment, three different types of linecards are utilized: Gigabit Ethernet (GigE) cards 602, Fibre Channel (FC) cards 604, and WAN cards 606. Other embodiments may include more or fewer types of linecards. The GigE cards 602 are for Ethernet connections, connecting in one embodiment to either iSCSI servers or iSCSI storage devices (or other Ethernet based devices). The FC cards 604 are for Fibre Channel connections, connecting to either Fibre Channel Protocol (FCP) servers or FCP storage devices. The WAN cards 606 are for connecting to a MAN or WAN.

Figure 10:
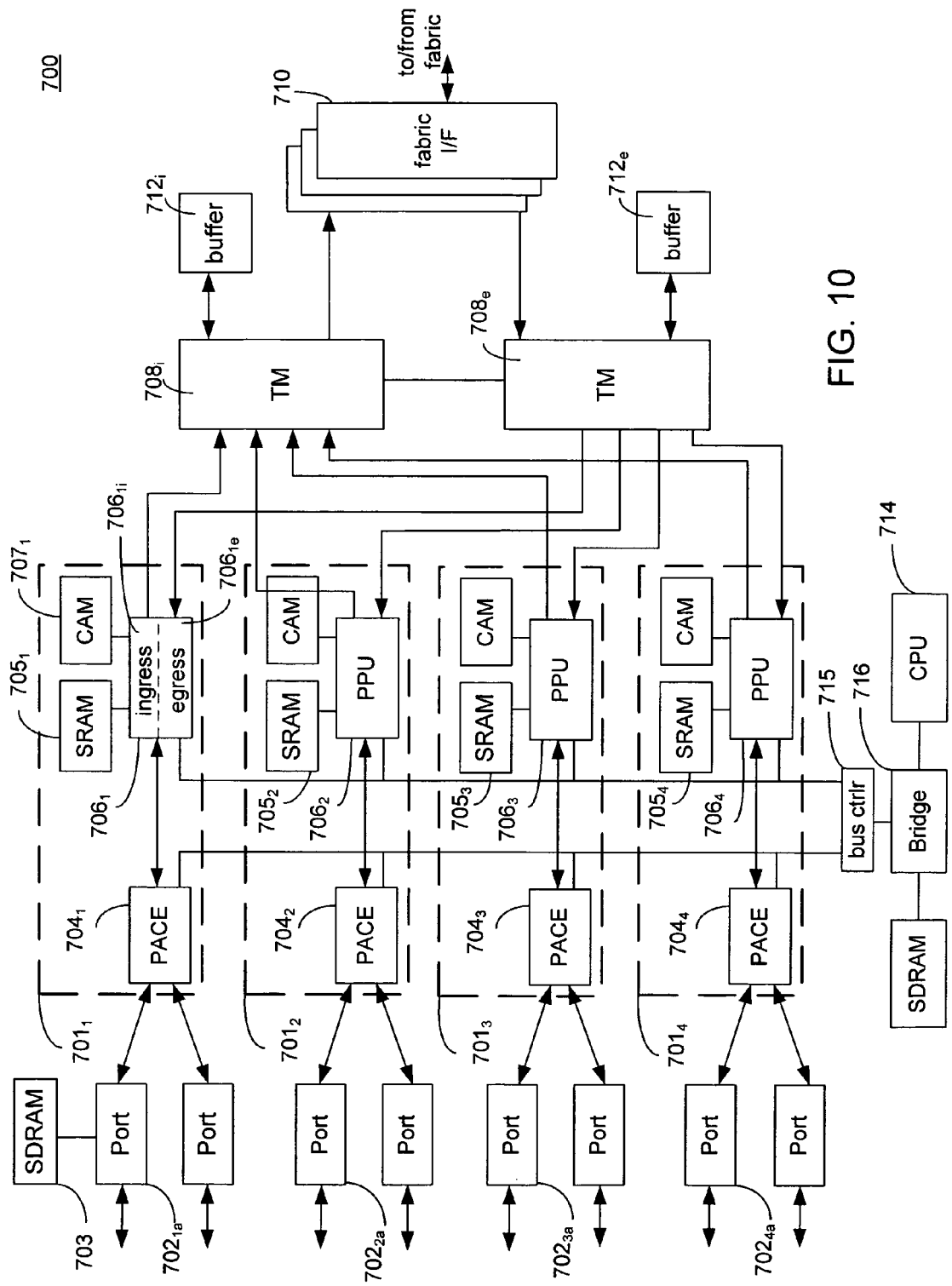
FIG. 10 is a generalized functional block diagram of a linecard used in a storage switch in accordance with one embodiment.

FIG. 10 illustrates a functional block diagram of a generic line card 700 used in a storage switch 504 in accordance with one embodiment. Line card 700 is presented for exemplary purposes only. Other line cards and designs can be used in accordance with embodiments. The illustration shows those components that are common among all types of linecards, e.g., GigE FC, or WAN. In other embodiments, other types of linecards can be utilized to connect to devices using other protocols, such as Infiniband.

Ports. Each line card 700 includes a plurality of ports 702. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 804. The ports of each linecard are full duplex in one embodiment, and connect to either a server or other client, and/or to a storage device or subsystem.

In addition, each port 702 has an associated memory 703. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 701. In one embodiment the SPU rapidly processes the data traffic allowing for wire-speed operations. In one embodiment, each SPU includes several elements: a Packet Aggregation and Classification Engine (PACE) 704, a Packet Processing Unit (PPU) 706, an SRAM 705, and a CAM 707. Other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 704. As illustrated, the PACE 704 aggregates two ports into a single data channel having twice the bandwidth. For instance, the PACE 704 aggregates two 1 Gb ports into a single 2 Gb data channel. The PACE can classify each received packet into a control packet or a data packet. Control packets are sent to the CPU 714 for processing, via bridge 716. Data packets are sent to a Packet Processing Unit (PPU) 706, discussed below, with a local header added. In one embodiment the local header is sixteen bytes resulting in a data "cell" of 64 bytes (16 bytes of header and 48 bytes of payload). The local header is used to carry information and used internally by switch 504. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $706_1$, while all four PACEs in the illustrated embodiment share a path to the CPU 714, which in one embodiment is a 104 MHz/32 (3.2 Gbps) bit data path.

Packet Processing Unit (PPU). Each PPU such as PPU $706_1$ performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. Each PPU in linecard 700 is configured to process both ingress and egress data for two parts. Each port may have a different port speed, which can include without limitation, 1 Gbps, 2 Gbps, 4 Gbps, or 10 Gbps.

The PPU in one embodiment includes an ingress PPU 706$_{1i}$ and an egress PPU 706$_{1e}$, which both run concurrently. The ingress PPU 706$_{1i}$ receives incoming data from PACE 704$_1$, and sends data to the Traffic Manager 708$_i$ while the egress PPU 706$_{1e}$ receives data from Traffic Manager 708$_e$ and sends data to a PACE 704$_1$. Although only one PPU 706$_1$, is shown in FIG. 10 as having an ingress PPU 706$_{1i}$ and an egress PPU 706$_{1e}$, it is to be understood that in one embodiment all PPUs 706 will include both an ingress and an egress PPU and that only one PPU is shown in FIG. 10 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 714 of the linecard 700 informs a PPU 706 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU 706$_1$ are connected to an SRAM 705$_1$ and CAM 707$_1$. SRAM 705$_1$ can store a VTD and PTD database. A listing of VTD Identifiers (VTD IDs), or addresses, as well as PTD Identifiers (PTD IDs), is also maintained in the PPU CAM 707$_1$ for quick accessing of the VTDs. The VTD IDs are indexed (mapped) using a TCP Control Block Index and a LUN. The PTD IDs are indexed using a VTD ID. In addition, for IP routing services, the CAM 707$_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 707 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 708 on each linecard 700: one TM 708$_i$ for ingress traffic and one TM 708$_e$ for egress traffic. The ingress TM receives cells from all four SPUs, in the form of 64-byte data cells, in one embodiment. In such an embodiment, each data cell has 16 bytes of local header and 48 bytes of payload. The header contains a Flow ID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 710 in one embodiment. Other embodiments may operate at 125 Mhz or other speeds. The egress TM receives the data cells from the fabric cards and delivers them to the four SPUs.

Both ingress and egress TMs have a large buffer 712 to queue cells for delivery. Both buffers 712 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 710 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 710.

CPU. On every linecard there is a processor (CPU) 714, which in one embodiment is a PowerPC 750 Cxe. In one embodiment, CPU 714 connects to each PACE with a 3.2 Gb bus, via a bus controller 715 and a bridge 716. In addition, CPU 714 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 714 and the SCC 710 are involved. When a TCP packet is received, and after initial handshaking is performed, a TCP control block is created and stored in the GigE port memory 703. A VTD is also retrieved from an object of the SCC database and stored in the CPU SDRAM 705 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 705. The CPU creates the VTD by retrieving the VTD information stored in its SDRAM and originally obtained from the SCC database. A VTD ID is established in a list of VTD IDs in the SPU CAM 707 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, 7 identifying a specific TCP connection. For a non-TCP packet or a TCP packet not containing an iSCSI PDU, the port receives and transmits the packet without acting as a termination point for the connection. Typically, the port 702 communicates with the PACE 904 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb or another speed. As a 1 Gb port, two ports are connected to a single PACE as illustrated in FIG. 7; but in one embodiment where it is configured as a 2 Gb port, port traffic and traffic that can be accommodated by the SPU can match to avoid congestion at the SPU. The port connects to the PACE with a POS/PHY interface in one embodiment. Each port can be configured separately, i.e. one PACE may have two 1 Gb ports and another PACE a single 2 Gb port, or one PACE may be connected to a first port of a first speed (e.g., 1 Gb) and a second port of a second speed (e.g. 10 Gb).

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

One of ordinary skill in the art will have a general knowledge of the iSCSI and FC protocols. For more information on iSCSI, however, refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety.

For more information regarding storage switches and related processing and functionality such as the creation of storage pools, provisioning virtual targets and initiator connections, user domains, packet classification, and various switch-based storage operations including virtualization, command packet transfer, write and read data packet transfer, etc., see U.S. patent application Ser. No. 10/051,321, entitled STORAGE SWITCH FOR STORAGE AREA NETWORK, filed Jan. 18, 2002 and U.S. patent application Ser. No. 10/051,396, entitled VIRTUALIZATION IN A STORAGE SYSTEM, filed Jan. 18, 2002.

Timing in Storage Switches

A storage switch in accordance with embodiments can perform many switch based storage operations. The storage switch may collect various performance and statistical related data to provide optimal performance when transferring data between initiating or host devices and physical storage subsystems. In one embodiment, for example, an SPU (including a PPU) of a linecard may collect the following information for each connection between an initiator and a virtual target:

1. Total read access (number of read requests);
2. Accumulated read transfer bytes (total number of bytes read from storage);
3. Accumulated read response time (time from receiving request to getting a response);
4. Total write access (number of write requests);
5. Accumulated write transfer bytes;
6. Accumulated write response time;
7. Accumulated recoverable errors; and
8. Accumulated unrecoverable errors The CPU on each linecard can periodically request the statistics from the SPU. The SPU can respond by returning the data. The SPU then resets the data to zero and resumes collection. Based on the collected data, the CPU can maintain the following statistics:

1. Average read access rate;
2. Maximum read access rate;
3. Average read transfer rate;
4. Maximum read transfer rate;
5. Minimum read response time;
6. Average read response time;
7. Maximum read response time;
8. Average write access rate;
9. Maximum write access rate;
10. Average write transfer rate;
11. Maximum write transfer rate;
12. Minimum write response time;
13. Average write response time;
14. Maximum write response time;
15. Recoverable errors per billion of requests;
16. Unrecoverable errors per billion of requests.

In addition, the SPU may collect information relating to bandwidth and performance at a particular port. For example, a PPU may calculate bandwidth at one or more ports to which an initiator or storage device is connected. The PPU and linecard CPU may use this information to perform bandwidth management, to enforce quality of service in a storage network, or to implement load balancing in a storage network. For more information on such tasks, see: co-pending U.S. patent application Ser. No. 10/051,339, entitled ENFORCING QUALITY OF SERVICE IN A STORAGE NETWORK, filed Jan. 18, 2002; co-pending U.S. patent application Ser. No. 10/051,053, entitled LOAD BALANCING IN A STORAGE NETWORK, filed Jan. 18, 2002; and co-pending U.S. patent application Ser. No. 10/836,133, entitled STORAGE SWITCH TRAFFIC BANDWIDTH CONTROL, filed Apr. 30, 2004.

In one embodiment, the PPU of a linecard calculates bandwidth at a port according to some specified interval of time rather than the amount of data per frame. By calculating bandwidth for every time interval (which may include multiple frames) rather than for every frame, efficiency improvements can be achieved.

Because the port speeds may vary, the interval of bandwidth calculation should be different in order to provide a consistent representation of bandwidth. For example, a single PPU may calculate the bandwidth at a 10 Gbps port and a 1 Gbps port. Because the 10 Gbps port is faster, a shorter time interval should be used for each calculation compared to the time interval for a calculation at the 1 Gbps port. In order to provide such calculations, a timer having a higher or finer resolution must be used for the 10 Gbps port calculation.

In accordance with embodiments, derived timers can be used to provide different time intervals needed for each calculation. For example, a source timer of the PPU could be used to perform bandwidth calculations for the 10 Gbps port while a timer derived from the source timer and having a coarser resolution could be used to perform bandwidth calculations for the 1 Gbps port. In one embodiment, the total number of tasks to be managed by a PPU can be determined. Those tasks requiring a high resolution timer, such as bandwidth calculations for a high speed port, can be classified as time-critical. The remaining tasks can be classified as less time-critical. Using the novel method depicted with respect to FIGS. 3–7, a number of derived timers as well as their resolutions and start times can be determined. The tasks can be appropriately assigned to one of the source or derived timers using the novel method presented herein.

In other embodiments, the classification of a port related task can be made based on a result presented to a user. For example, a user may choose to view a real-time calculation of the bandwidth at a port to which an initiator or storage device is connected (e.g., via a management station). This calculation may be presented in a first display. At the same time, the user may choose to view a real-time calculation of the bandwidth at a second port which is managed by the same PPU as the first port. This calculation may be presented in a second display. Whichever bandwidth calculation task is currently being viewed by the user (e.g., as determined by which display is active), can be determined to be more critical than the other calculation. Accordingly, the task for the calculation being viewed can be assigned to a higher resolution timer to provide a more frequent update of the bandwidth calculation to the user. The same principle can apply if background bandwidth calculations (not currently presented in a display) are being performed along with other calculations that are being displayed.

Numerous other implementations of derived timers and associated methods for their determination can be used in accordance with embodiments related to storage area network switches. The foregoing examples are merely illustrative of a small subset of such applications.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A method of providing timers for a plurality of periodic tasks, comprising:

providing a source timer having a source timer interval;
determining a first number of the plurality of periodic tasks that can be completed during said source timer interval;
classifying a second number of the plurality of periodic tasks as most time-critical;

classifying a third number of the plurality of periodic tasks as less time-critical; and providing a number of derived timers to be used for said plurality of tasks, wherein providing said number of derived timers includes determining said number to provide as greater than or equal to one less than a first result determined by dividing said third number of less time-critical tasks by a difference between said first number of the plurality of the periodic tasks that can be completed during said source timer interval and said second number of most time-critical tasks.

2. The method of claim 1, further comprising:

determining an interval for each of said derived timers, wherein determining said interval for each of said derived timers includes multiplying said source timer interval by $2^n$, wherein n is a positive whole number used to individually represent each of said derived timers, said n having a maximum value equal to said number of derived timers and having a minimum value of one.

3. The method of claim 2, wherein:

said number of derived timers includes a first derived timer;

n equals one for said first derived timer; and said first derived timer has an interval equal to 2 times said source timer interval.

4. The method of claim 2, wherein:

said source timer includes a start time; and said method further comprises:
   determining a start time for each of said derived timers, wherein determining said start time for each of said derived timers includes adding said source timer start time to a second result determined by multiplying said source timer interval by $2^{n-1}$.

5. The method of claim 4, wherein:

said number of derived timers includes a first derived timer having a largest interval of said number of derived timers;

said first derived timer includes a first instance having a start time determined by adding said source timer start time to said second result determined by multiplying said source timer interval by $2^{n-1}$; and said first derived timer includes a second instance having a start time equal to said source timer start time.

6. The method of claim 5, further comprising:

assigning said third number of less time-critical tasks to said derived timers.

7. The method of claim 6, wherein:

said step of assigning includes assigning a first selected number of said third number of less time-critical tasks to each of said derived timers except said first derived timer, said first selected number is equal to said difference between said first number of the plurality of the periodic tasks that can be completed during said source timer interval and said second number of most time-critical tasks.

8. The method of claim 7, wherein said step of assigning includes:

assigning a first half of a second selected number of said third number of less time-critical tasks to said first instance of said first derived timer, said second selected number is equal to two times said difference between said first number of the plurality of the periodic tasks that can be completed during said source timer interval and said second number of most time-critical tasks; and assigning a second half of said second selected number of said third number of less time-critical tasks to said second instance of said first derived timer.

9. The method of claim 8, further comprising:

classifying a subset of said third number of less time-critical tasks as least critical tasks, said second selected number is a number of tasks in said subset of least time-critical tasks.

10. The method of claim 9, wherein:

said step of classifying is performed prior to said steps of assigning a first half and assigning a second half.

11. The method of claim 1, wherein said step of classifying a second number of the plurality of period tasks as most time-critical tasks comprises:

determining which of the plurality of periodic tasks must be completed during said source timer interval; and classifying those periodic tasks that must be completed during said source timer interval as most time-critical.

12. The method of claim 11, wherein said step of determining which of the plurality of periodic tasks do not have to completed during said source timer interval comprises:

determining which periodic tasks of the plurality have a hard time-limit that is less than said source timer interval.

13. The method of claim 1, wherein said step of classifying a third number of the plurality of periodic tasks as less time-critical comprises:

determining which periodic tasks of the plurality do not have to be completed during said source timer interval; and classifying those periodic tasks that do not have to be completed during said source timer interval as less time-critical.

14. The method of claim 13, wherein said step of determining which of the plurality of periodic tasks do not have to be completed during said source timer interval comprises:

determining which periodic tasks of the plurality have a hard time-limit that is greater than said source timer interval.

15. A system for time-based task processing, comprising:

a plurality of periodic tasks including a first number of tasks that are most time-critical and a second number of tasks that are less time-critical;

a source timer having a source timer interval, wherein a third number of said plurality of periodic tasks are capable of being completed during said source timer interval; and a number of derived timers based on said source timer, said number of derived timers is greater than or equal to one less than a first result obtained by dividing said second number of less time-critical tasks by a difference between said third number of said plurality of periodic tasks capable of being completed during said source timer interval and said first number of most time-critical tasks.

16. The system of claim 15, wherein:

each of said derived timers has an interval equal to a second result obtained by multiplying said source timer interval by $2^n$ wherein n is a positive whole number used to individually represent each of said derived timers, said n having a maximum value equal to said number of derived timers and having a minimum value of one.

17. The system of claim 16, wherein:
said number of derived timers includes a first derived timer;
n equals one for said first derived timer; and
said first derived timer has an interval equal to 2 times said source timer interval.

18. The system of claim 16, wherein:
said source timer includes a start time; and
each of said derived timers has a start time equal to a third result obtained by adding said source timer start time to a fourth result determined by multiplying said source timer interval by $2^{n-1}$.

19. The system of claim 18, wherein:
said number of derived timers includes a first derived timer having a largest interval of said number of derived timers;
said first derived timer includes a first instance having a start time determined by adding said source timer start time to said third result; and
said first derived timer includes a second instance having a start time equal to said source timer start time.

20. The system of claim 19, wherein:
a first selected number of said second number of less time-critical tasks is assigned to each of said derived timers except said first derived timer, said first selected number is equal to said difference between said third number of the plurality of the periodic tasks that can be completed during said source timer interval and said first number of most time-critical tasks.

21. The system of claim 20, wherein:
a first half of a second selected number of said second number of less time-critical tasks is assigned to said first instance of said first derived timer, said second selected number is equal to two times said difference between said third number of the plurality of the periodic tasks that can be completed during said source timer interval and said first number of most time-critical tasks; and
assigning a second half of said second selected number of said second number of less time-critical tasks to said second instance of said first derived timer.

22. The system of claim 21, further comprising:
said second selected number of said second number of less time-critical tasks are least time-critical tasks.

23. The system of claim 15, wherein said first number of most time-critical tasks must be completed during said source timer interval.

24. The system of claim 23, wherein said first number of most time-critical tasks have a hard time-limit that is less than said source timer interval.

25. The system of claim 1, wherein said second number of less time-critical tasks do not have to be completed during said source timer interval.

26. The system of claim 25, wherein said second number of less time-critical tasks have a hard time-limit that is greater than said source timer interval.

27. One or more processor readable storage devices having processor readable code embodied on said one or more processor readable storage devices, said processor readable code for programming one or more processors to perform a method comprising:
providing a source timer having a source timer interval;
determining a first number of the plurality of periodic tasks that can be completed during said source timer interval;
classifying a second number of the plurality of periodic tasks as most time-critical;
classifying a third number of the plurality of periodic tasks as less time-critical; and
providing a number of derived timers to be used for said plurality of tasks, wherein providing said number of derived timers includes determining said number to provide as greater than or equal to one less than a first result determined by dividing said third number of less time-critical tasks by a difference between said first number of the plurality of the periodic tasks that can be completed during said source timer interval and said second number of most time-critical tasks.

28. One or more processor readable storage devices according to claim 27, wherein the method further comprises:
determining an interval for each of said derived timers, wherein determining said interval for each of said derived timers includes multiplying said source timer interval by $2^n$, wherein n is a positive whole number used to individually represent each of said derived timers, said n having a maximum value equal to said number of derived timers and having a minimum value of one.

29. One or more processor readable storage devices according to claim 28, wherein:
said source timer includes a start time; and
said method further comprises:
determining a start time for each of said derived timers, wherein determining said start time for each of said derived timers includes adding said source timer start time to a second result determined by multiplying said source timer interval by $2^{n-1}$.

30. One or more processor readable storage devices according to claim 29, wherein:
said number of derived timers includes a first derived timer having a largest interval of said number of derived timers;
said first derived timer includes a first instance having a start time determined by adding said source timer start time to said second result determined by multiplying said source timer interval by $2^{n-1}$; and
said first derived timer includes a second instance having a start time equal to said source timer start time.

31. One or more processor readable storage devices according to claim 30, wherein said method further comprises:
assigning said third number of less time-critical tasks to said derived timers.

32. One or more processor readable storage devices according to claim 31, wherein:
said step of assigning includes assigning a first selected number of said third number of less time-critical tasks to each of said derived timers except said first derived timer, said first selected number is equal to said difference between said first number of the plurality of the periodic tasks that can be completed during said source timer interval and said second number of most time-critical tasks.

33. One or more processor readable storage devices according to claim 32, wherein said step of assigning includes:
assigning a first half of a second selected number of said third number of less time-critical tasks to said first instance of said first derived timer, said second selected number is equal to two times said difference between said first number of the plurality of the periodic tasks that can be completed during said source timer interval and said second number of most time-critical tasks; and assigning a second half of said second selected number of said third number of less time-critical tasks to said second instance of said first derived timer.

34. One or more processor readable storage devices according to claim 33, wherein said method further comprises:

classifying a subset of said third number of less time-critical tasks as least critical tasks, said second selected number is a number of tasks in said subset of least time-critical tasks.

35. One or more processor readable storage devices according to claim 34, wherein:

said step of classifying is performed prior to said steps of assigning a first half and assigning a second half.

36. One or more processor readable storage devices according to claim 27, wherein said step of classifying a second number of the plurality of period tasks as most time-critical tasks comprises:

determining which of the plurality of periodic tasks must be completed during said source timer interval; and classifying those periodic tasks that must be completed during said source timer interval as most time-critical.

37. One or more processor readable storage devices according to claim 27, wherein said step of classifying a third number of the plurality of periodic tasks as less time-critical comprises:

determining which periodic tasks of the plurality do not have to be completed during said source timer interval; and classifying those periodic tasks that do not have to be completed during said source timer interval as less time-critical.

* * * * *